United States Patent Office 3,825,606
Patented July 23, 1974

3,825,606
FLUOROCYCLOPROPANES AS INHALATION ANESTHETICS
Gerald J. O'Neill, Arlington, Charles W. Simon, Bedford, and Charles A. Billings, Concord, Mass., assignors to W. R. Grace & Co., Cambridge, Mass.
No Drawing. Filed June 2, 1972, Ser. No. 258,957
Int. Cl. C07c 23/04
U.S. Cl. 260—648 F          1 Claim

ABSTRACT OF THE DISCLOSURE

New compounds 1-chloro-1,2,2-trifluorocyclopropane and 1-bromo-2,2-difluorocyclopropane have been found useful as general inhalation anesthetics.

THE PRIOR ART

Although a certain number of halogenated hydrocarbon compounds have joined the ranks of useful anesthetics in the recent past, little has been added to the understanding of the mode of action of chemical compounds in this physiological role, and the relationships of the differences between fairly closely similar compounds with either their toxic or therapeutic properties remain substantially unidentified. In view of this situation, the discovery of additional substances possessing a desirable combination of properties for anesthetic purposes still lies beyond the scope of routine expertise.

SUMMARY OF THE INVENTION

It has now been discovered that newly synthesized 1-chloro-1,2,2-trifluorocyclopropane and 1-bromo-2,2-difluorocyclopropane possess high potency as general anesthetics when administered to inhalation-anesthetic-susceptible organisms.

DETAILED DESCRIPTION

The two halocyclopropanes disclosed herein for the first time are new compounds which have been found to possess anesthetic properties.

The compounds can be prepared by the reaction of a $CF_2$-carbene with an olefin according to the method of P. B. Sargent [J. Org. Chem. 35 (3), 678–82 (1970)]. The $CF_2$-carbene is obtained by thermal splitting from hexafluoropropylene oxide, a compound that can be synthesized with relative ease [J. Org. Chem. 31, 2312 (1966)]. The reactions involved may be illustrated as follows:

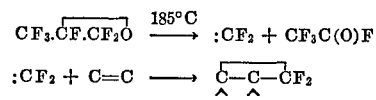

$$:CF_2 + C=C \longrightarrow \overset{\triangle\ \triangle}{C-C-CF_2}$$

It should be noted that this method of synthesis does not always yield the compound desired possibly because, in some instances, either the cyclization does not take place or, if it does, the resulting cyclocompound is unstable at carbene generating temperatures.

EXAMPLE 1

To prepare the chlorocyclopropane compound of the present invention, 4-t-butylpyrocatechol, 1 part by weight, is placed in a stainless steel autoclave. The autoclave is sealed, evacuated, and cooled to —78° C. 1-Chloro-1-fluoroethylene, 80.5 parts, and hexafluoropropylene oxide, 40.3 parts, are then introduced into the apparatus. The system is heated for 8 hours at 185° C. After cooling to room temperature, the contents of the autoclave are tranferred to a —196° C. trap. Materials boiling below room temperature are allowed to escape and the residue is purified by preparative vapor chromatography. The product has a molecular weight of 130, a boiling point of 31° C. and a $d_4^{20}$ of 1.358 g./ml.

EXAMPLE 2

To obtain the bromocyclobutane compound, 4-t-butylpyrocatechol, 1 part by weight, is placed in a stainless steel autoclave. The autoclave is sealed, evacuated, and cooled to —78° C. 1-Vinyl bromide, 116.2 parts, and hexafluoropropylene oxide, 46.4 parts, are then introduced into the apparatus. The system is heated for 8 hours at 185° C. After cooling to room temperature, the contents of the autoclave are transferred to a —196° C. trap. Materials boiling below room temperature are allowed to escape and the residue is purified by preparative vapor chromatography. The product has a molecular weight of 157, a boiling point of 68 to 68.5° C. and a $d_4^{20}$ of 1.725 g./ml.

EXAMPLE 3

The physiological effects of the two fluorocyclopropanes were demonstrated as follows, using a standard test for evaluation of inhalation anesthetics similar to that described by Robbins [J. Pharmacology and Experimental Therapeutics 86, 197 (1946)].

Mice were exposed to the anesthetic for a period of 10 minutes in a rotating drum. Observations were then made of the pinch reflex, the corneal reflex and the return of the righting reflex. At least four graded doses were employed to determine the minimum concentration required to anesthetize 50% of the mice used ($AC_{50}$) and the minimum concentration required to kill 50% of the mice ($LG_{50}$). The anesthetic index (AI) was then calculated from these minimum concentrations. The results of these tests are summarized in the following table.

ANESTHETIC PROPERTIES

| Cyclopropane | Percent volume | | AI[1] (LG$_{50}$/AC$_{50}$) |
|---|---|---|---|
| | AC$_{50}$ | LC$_{50}$ | |
| 1-chloro-1,2,2-trifluoro- | 4 | >8 | >2 |
| 1-bromo-2,2-difluoro- | <1.5 | 4 | 2–3 |

[1] When two figures are given, the actual value of the anesthetic index lies between these two figures.

For comparison, keeping in mind that other differences in properties also exist, the fact may be considered that the widely used 1,1,1-trifluoro - 2 - bromo - 2 - chloroethane showed an AI of 3.2 when tested under the same conditions.

What is claimed is:
1. 1-Chloro-1,2,2-trifluorocyclopropane.

References Cited

UNITED STATES PATENTS 3,349,136  10/1967  Boudakian et al. _____ 260—648 F
3,634,525   1/1972  Barkdoll et al. _____ 260—648 F

OTHER REFERENCES

Braker, Chemical Abstracts, vol. 71, p. 112462 (1969).

LEON ZITVER, BERNARD HELFIN, Primary Examiners

N. CHAN, Assistant Examiner

U.S. Cl. X.R.
424—352